United States Patent
Shutes et al.

(10) Patent No.: US 11,001,447 B2
(45) Date of Patent: May 11, 2021

(54) LIFTING FURNITURE (71) Applicant: Sleep Number Corporation, Minneapolis, MN (US)

(72) Inventors: Nathan Shutes, Belle Plaine, MN (US); Allan Kiekhoefer, Andover, MN (US); Darryl Schmitz, Plymouth, MN (US)

(73) Assignee: Sleep Number Corporation, Minneapolis, MN (US)

( * ) Notice: Subject to any disclaimer, the term of this patent is extended or adjusted under 35 U.S.C. 154(b) by 251 days.

(21) Appl. No.: 16/122,480

(22) Filed: Sep. 5, 2018

(65) Prior Publication Data

US 2020/0071079 A1 Mar. 5, 2020

(51) Int. Cl.
  *B65G 7/12* (2006.01)
  *B66F 15/00* (2006.01)
  *A61G 7/08* (2006.01)

(52) U.S. Cl.
  CPC ............... *B65G 7/12* (2013.01); *B66F 15/00* (2013.01); *A61G 7/08* (2013.01)

(58) Field of Classification Search
  CPC ..... B65G 7/12; A61G 7/08; B25J 1/02; B66F 15/00
  USPC .................................... 294/16, 118
  See application file for complete search history.

(56) References Cited

U.S. PATENT DOCUMENTS

| | | | | | |
|---|---|---|---|---|---|
| 1,767,898 | A | * | 6/1930 | Sargent | A47J 43/283 294/118 |
| 2,274,918 | A | * | 3/1942 | Chenette | B62B 3/04 294/15 |
| 2,367,627 | A | * | 1/1945 | Sterrett | B65G 7/12 294/15 |
| 2,968,510 | A | | 1/1961 | Ellis et al. | |
| 3,066,967 | A | * | 12/1962 | Gillpatrick | B65G 7/12 294/16 |
| 3,363,927 | A | * | 1/1968 | Wesemann | B65G 49/061 294/137 |
| 3,747,972 | A | * | 7/1973 | Mespelt | B25B 9/00 294/118 |

(Continued)

FOREIGN PATENT DOCUMENTS

| | | | |
|---|---|---|---|
| DE | 1 286 457 | * | 1/1969 |
| GB | 2324289 | | 10/1998 |
| GB | 2498003 | | 7/2013 |

OTHER PUBLICATIONS

U.S. Appl. No. 14/885,751, filed Oct. 16, 2015, Palashewski et al.

(Continued)

*Primary Examiner* — Dean J Kramer
(74) *Attorney, Agent, or Firm* — Fish & Richardson P.C.

(57) ABSTRACT

A first arm and a second arm each have a proximal end and a distal end. The first arm is pivotably connected to the second arm at a pivot point. A first handle is positioned at the first proximal end of the first arm. A second handle is positioned at the second proximal end of the second arm. A first foundation engagement portion is sized and configured to engage a first portion of a bed foundation. The first foundation engagement portion is positioned at the first distal end of the first arm. A second foundation engagement portion is sized and configured to engage a second portion of the bed foundation. The second foundation engagement portion is positioned at the second distal end of the second arm.

17 Claims, 3 Drawing Sheets

(56) References Cited

U.S. PATENT DOCUMENTS

| | | | |
|---|---|---|---|
| 4,055,364 | A | 10/1977 | Breite |
| 4,063,767 | A * | 12/1977 | Hardin .................. A01G 25/00 294/16 |
| 4,215,889 | A | 8/1980 | Rayburn |
| 4,572,566 | A * | 2/1986 | Terrington .............. B65G 7/12 294/118 |
| 4,766,628 | A | 8/1988 | Greer et al. |
| 4,788,729 | A | 12/1988 | Greer et al. |
| D300,194 | S | 3/1989 | Walker |
| 4,829,616 | A | 5/1989 | Walker |
| 4,890,344 | A | 1/1990 | Walker |
| 4,897,890 | A | 2/1990 | Walker |
| 4,908,895 | A | 3/1990 | Walker |
| 4,929,010 | A * | 5/1990 | Lahti .................... A01G 23/043 294/118 |
| D313,973 | S | 1/1991 | Walker |
| 4,991,244 | A | 2/1991 | Walker |
| 5,144,706 | A | 9/1992 | Walker et al. |
| 5,170,522 | A | 12/1992 | Walker |
| D368,475 | S | 4/1996 | Scott |
| 5,509,154 | A | 4/1996 | Shafer et al. |
| 5,564,140 | A | 10/1996 | Shoenhair et al. |
| 5,642,546 | A | 6/1997 | Shoenhair |
| 5,652,484 | A | 7/1997 | Shafer et al. |
| 5,765,246 | A | 6/1998 | Shoenhair |
| 5,903,941 | A | 5/1999 | Shafer et al. |
| 5,904,172 | A | 5/1999 | Gifft et al. |
| 6,037,723 | A | 3/2000 | Shafer et al. |
| 6,108,844 | A | 8/2000 | Kraft et al. |
| 6,161,231 | A | 12/2000 | Kraft et al. |
| 6,202,239 | B1 | 3/2001 | Ward et al. |
| 6,325,432 | B1 * | 12/2001 | Sensat .................. B25B 7/00 294/118 |
| 6,397,419 | B1 | 6/2002 | Mechache |
| 6,483,264 | B1 | 11/2002 | Shafer et al. |
| 6,686,711 | B2 | 2/2004 | Rose et al. |
| 6,708,357 | B2 | 3/2004 | Gaboury et al. |
| 6,763,541 | B2 | 7/2004 | Mahoney et al. |
| 6,804,848 | B1 | 10/2004 | Rose |
| 6,832,397 | B2 | 12/2004 | Gaboury |
| D502,929 | S | 3/2005 | Copeland et al. |
| 6,883,191 | B2 | 5/2005 | Gaboury et al. |
| 7,389,554 | B1 | 6/2008 | Rose |
| 7,865,988 | B2 | 1/2011 | Koughan et al. |
| 8,336,369 | B2 | 12/2012 | Mahoney |
| 8,444,558 | B2 | 5/2013 | Young et al. |
| D691,118 | S | 10/2013 | Ingham et al. |
| D697,874 | S | 1/2014 | Stusynski et al. |
| D698,338 | S | 1/2014 | Ingham |
| D701,536 | S | 3/2014 | Sakal |
| 8,672,853 | B2 | 3/2014 | Young |
| 8,769,747 | B2 | 7/2014 | Mahoney et al. |
| 8,845,264 | B2 * | 9/2014 | Kubiak .................. A61G 7/08 414/495 |
| 8,893,339 | B2 | 11/2014 | Fleury |
| 8,931,329 | B2 | 1/2015 | Mahoney et al. |
| 8,966,689 | B2 | 3/2015 | McGuire et al. |
| 8,973,183 | B1 | 3/2015 | Palashewski et al. |
| 8,984,687 | B2 | 3/2015 | Stusynski et al. |
| D737,250 | S | 8/2015 | Ingham et al. |
| 9,131,781 | B2 | 9/2015 | Zaiss et al. |
| 9,370,457 | B2 | 6/2016 | Nunn et al. |
| 9,392,879 | B2 | 7/2016 | Nunn et al. |
| 9,510,688 | B2 | 12/2016 | Nunn et al. |
| 9,630,778 | B1 * | 4/2017 | Coates .................. B65G 7/12 |
| 9,635,953 | B2 | 5/2017 | Nunn et al. |
| 9,730,524 | B2 | 8/2017 | Chen et al. |
| 9,737,154 | B2 | 8/2017 | Mahoney et al. |
| 9,770,114 | B2 | 9/2017 | Brosnan et al. |
| D809,843 | S | 2/2018 | Keeley et al. |
| D812,393 | S | 3/2018 | Karschnik et al. |
| 9,924,813 | B1 | 3/2018 | Basten et al. |
| 10,058,467 | B2 | 8/2018 | Stusynski et al. |
| 10,092,242 | B2 | 10/2018 | Nunn et al. |
| 10,143,312 | B2 | 12/2018 | Brosnan et al. |
| 10,149,549 | B2 | 12/2018 | Erko et al. |
| 10,182,661 | B2 | 1/2019 | Nunn et al. |
| 10,194,752 | B2 | 2/2019 | Zaiss et al. |
| 10,194,753 | B2 | 2/2019 | Fleury et al. |
| 10,201,234 | B2 | 2/2019 | Nunn et al. |
| 10,251,490 | B2 | 4/2019 | Nunn et al. |
| 2002/0145294 | A1 | 10/2002 | Clark et al. |
| 2007/0062954 | A1 | 3/2007 | Lowe et al. |
| 2008/0077020 | A1 | 3/2008 | Young et al. |
| 2011/0144455 | A1 | 6/2011 | Young et al. |
| 2012/0025550 | A1 * | 2/2012 | Gonzalez Sanchez .. B65G 7/12 294/15 |
| 2014/0250597 | A1 | 9/2014 | Chen et al. |
| 2014/0259418 | A1 | 9/2014 | Nunn et al. |
| 2014/0277822 | A1 | 9/2014 | Nunn et al. |
| 2015/0007393 | A1 | 1/2015 | Palashewski |
| 2015/0025327 | A1 | 1/2015 | Young et al. |
| 2015/0182397 | A1 | 7/2015 | Palashewski et al. |
| 2015/0182399 | A1 | 7/2015 | Palashewski et al. |
| 2015/0182418 | A1 | 7/2015 | Zaiss |
| 2016/0100696 | A1 | 4/2016 | Palashewski et al. |
| 2016/0242562 | A1 | 8/2016 | Karschnik et al. |
| 2016/0338871 | A1 | 11/2016 | Nunn et al. |
| 2016/0367039 | A1 | 12/2016 | Young et al. |
| 2017/0003666 | A1 | 1/2017 | Nunn et al. |
| 2017/0049243 | A1 | 2/2017 | Nunn et al. |
| 2017/0191516 | A1 | 7/2017 | Griffith et al. |
| 2017/0303697 | A1 | 10/2017 | Chen et al. |
| 2017/0318980 | A1 | 11/2017 | Mahoney et al. |
| 2017/0354268 | A1 | 12/2017 | Brosnan et al. |
| 2018/0116415 | A1 | 5/2018 | Karschnik et al. |
| 2018/0116418 | A1 | 5/2018 | Shakal et al. |
| 2018/0116419 | A1 | 5/2018 | Shakal et al. |
| 2018/0116420 | A1 | 5/2018 | Shakal |
| 2018/0119686 | A1 | 5/2018 | Shakal et al. |
| 2018/0125259 | A1 | 5/2018 | Peterson et al. |
| 2018/0125260 | A1 | 5/2018 | Peterson et al. |
| 2019/0059603 | A1 | 2/2019 | Griffith et al. |
| 2019/0082855 | A1 | 3/2019 | Brosnan et al. |
| 2019/0104858 | A1 | 4/2019 | Erko et al. |
| 2019/0125095 | A1 | 5/2019 | Nunn et al. |
| 2019/0125097 | A1 | 5/2019 | Nunn et al. |
| 2019/0200777 | A1 | 7/2019 | Demirli et al. |
| 2019/0201265 | A1 | 7/2019 | Sayadi et al. |
| 2019/0201266 | A1 | 7/2019 | Sayadi et al. |
| 2019/0201267 | A1 | 7/2019 | Demirli et al. |
| 2019/0201268 | A1 | 7/2019 | Sayadi et al. |
| 2019/0201269 | A1 | 7/2019 | Sayadi et al. |
| 2019/0201270 | A1 | 7/2019 | Sayadi et al. |
| 2019/0201271 | A1 | 7/2019 | Grey et al. |
| 2019/0206416 | A1 | 7/2019 | Demirli et al. |
| 2019/0209405 | A1 | 7/2019 | Sayadi et al. |

OTHER PUBLICATIONS

U.S. Appl. No. 15/806,810, filed Nov. 8, 2017, Gaunt.
U.S. Appl. No. 29/690,492, filed May 8, 2019, Stusynski et al.
U.S. Appl. No. 29/676,117, filed Jan. 8, 2019, Stusynski et al.
U.S. Appl. No. 29/583,852, filed Nov. 9, 2016, Keeley.
U.S. Appl. No. 16/294,120, filed Mar. 6, 2019, Sayadi et al.
U.S. Appl. No. 16/233,339, filed Dec. 27, 2018, Sayadi et al.

* cited by examiner

LIFTING FURNITURE

TECHNICAL FIELD

This disclosure relates to tools used to lift and move furniture.

BACKGROUND

Large, bulky, and/or heavy furniture is often difficult to move. A variety of tools exist to assist in moving such furniture, such as lifting straps and furniture dollies.

SUMMARY

This disclosure describes technologies relating to lifting furniture items, including lifting a bed foundation such as an adjustable bed foundation.

An example implementation of the subject matter described within this disclosure is a tool, for engaging and lifting a bed foundation, with the following features. A first arm has a first proximal end and a first distal end. A second arm has a second proximal end and a second distal end. The first arm is pivotably connected to the second arm at a pivot point that is positioned along the first arm and spaced from each of the first proximal end and the first distal end and that is positioned along the second arm and spaced from each of the second proximal end and the second distal end. A first handle is positioned at the first proximal end of the first arm. A second handle is positioned at the second proximal end of the second arm. A first foundation engagement portion is sized and configured to engage a first portion of a bed foundation. The first foundation engagement portion is positioned at the first distal end of the first arm. A second foundation engagement portion is sized and configured to engage a second portion of the bed foundation. The second foundation engagement portion is positioned at the second distal end of the second arm.

Aspects of the example implementation, which can be combined with the example implementation alone or in combination, include the following. The first arm and the second arm have identical rectangular cross-sections. Sides of the arms that are parallel to one another have a greater cross-sectional length than the sides of the arms being perpendicular to one another.

Aspects of the example implementation, which can be combined with the example implementation alone or in combination, include the following. The first handle and the second handle are cylindrical. The first and second handle are parallel to a pivot axis.

Aspects of the example implementation, which can be combined with the example implementation alone or in combination, include the following. The first handle and the second handle include a non-slip surface along their outer circumference.

Aspects of the example implementation, which can be combined with the example implementation alone or in combination, include the following. The non-slip surface comprises an elastomer coating.

Aspects of the example implementation, which can be combined with the example implementation alone or in combination, include the following. The first handle and the second handle extend from the first arm and the second arm, respectively, in the same direction.

Aspects of the example implementation, which can be combined with the example implementation alone or in combination, include the following. The first foundation engagement portion and the second foundation engagement portion extend from the first arm and the second arm, respectively, in the same direction as the first handle and the second handle.

Aspects of the example implementation, which can be combined with the example implementation alone or in combination, include the following. The first foundation engagement portion and the second foundation engagement portion are cylindrical.

Aspects of the example implementation, which can be combined with the example implementation alone or in combination, include the following. The first foundation engagement portion and the second foundation engagement portion are welded to the first arm and the second arm respectively.

Aspects of the example implementation, which can be combined with the example implementation alone or in combination, include the following. The first handle and the second handle are welded to the first arm and the second arm respectively.

An example implementation of the subject matter described within this disclosure is a system with the following features. The system includes the previously described tool and a bed foundation. The tool is engaged with the bed foundation with the first foundation engagement portion of the tool connected to the first portion of the bed foundation and the second foundation engagement portion of the tool connected to the second portion of the bed foundation.

Aspects of the example implementation, which can be combined with the example implementation alone or in combination, include the following. The previously described tool is a first tool. The system further includes a second tool that is substantially identical to the first tool. The second is engaged with the bed foundation with a first foundation engagement portion of the second tool connected to a third portion of the bed foundation and a second foundation engagement portion of the second tool connected to a fourth portion of the bed foundation.

Aspects of the example implementation, which can be combined with the example implementation alone or in combination, include the following. The first and second portions of the bed foundation include first and second leg portions.

Aspects of the example implementation, which can be combined with the example implementation alone or in combination, include the following. The first and second portions of the bed foundation include first and second leg sockets configured for receiving and holding legs. The first and second foundation engagement portions are positioned at least partially in the first and second leg sockets to engage the first and second leg sockets.

An example implementation of the subject matter described within this disclosure is a method with the following features. a portion of a tool is received by a bed foundation. The bed foundation is lifted by the tool in a substantially vertical alignment with a top of the bed foundation facing one side and a bottom of the bed foundation facing an opposite side. The portion of the tool is retained by the bed foundation, within the bed foundation, during lifting operations.

Aspects of the example implementation, which can be combined with the example implementation alone or in combination, include the following. The bed foundation is moved from a first location to a second location that includes moving the bed foundation either up or down a staircase. The tool is retained by the bed foundation, within the bed foundation, during moving operations including during moving either up or down the staircase.

Aspects of the example implementation, which can be combined with the example implementation alone or in combination, include the following. The tool includes a first and second foundation engagement portions that are sized and configured to be inserted in first and second leg sockets of the bed foundation. The first and second foundation engagement portions are inserted into the first and second leg sockets of the bed foundation prior to lifting. The first and second foundation engagement portions are removed from the first and second leg sockets. First and second leg portions are inserted in the first and second leg sockets after removing the first and second foundation engagement portions from the first and second leg sockets.

An example implementation of the subject matter described within this disclosure is an engaging and lifting tool for a furniture item with the following features. A first member has a rectangular cross section and has a first proximal end and a first distal end. A second member has a second proximal end and a second distal end. The first member is pivotably connected to the second member at a pivot point that is positioned along the first member and spaced from each of the first proximal end and the first distal end and that is positioned along the second member and spaced from each of the second proximal end and the second distal end. The pivot point is equally spaced from the first proximal end and the second proximal end. A first handle is positioned at the first proximal end of the first member. A second handle is positioned at the second proximal end of the second member. A first foundation engagement portion is sized and configured to engage a first portion of a furniture foundation. The first foundation engagement portion is positioned at the first distal end of the first member. A second foundation engagement portion is sized and configured to engage a second portion of the furniture foundation. The second foundation engagement portion is positioned at the second distal end of the second member.

Aspects of the example implementation, which can be combined with the example implementation alone or in combination, include the following. The first foundation engagement portion and the second foundation engagement portion are configured to be inserted into a first receiving portion of the furniture foundation and a second receiving portion of the furniture foundation, respectively.

Aspects of the example implementation, which can be combined with the example implementation alone or in combination, include the following. The pivot point is closer to the first proximal end and the second proximal end than the first distal end and the second distal end.

Particular implementations of the subject matter described in this disclosure can be implemented so as to realize one or more of the following advantages. Aspects of the subject matter described herein allow installers to more easily move and control a bed foundation in a vertical position. Such a position can ease movement through doorways and up or down a staircase. Lifting a bed foundation as described herein can allow for movement of the foundation in a manner that reduces damage to the foundation. Lifting a bed foundation as described herein can make lifting easier and more ergonomically correct for users as well as reduce strain and injuries of users. Lifting a bed foundation as described herein can reduce physical contact with the foundation, reducing potential transfer of stains from the hands or clothing to the foundation.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Bed foundations, such as adjustable bed foundations that include actuators to change a contour of the bed, can be particularly heavy and difficult to move. The foundations are large enough that they are often carried vertically through doorways and up stairs. The outside of a bed foundation can be relatively smooth, offering little in the way of grip for an installer moving the foundation to a desired location. In addition, the sensitive actuation components of the foundation do not make ideal grips and can be damaged during moving operations if used as such.

This disclosure relates to tool (e.g. a lifting tool) that can be used for lifting furniture pieces, including bed foundations. The lifting tool includes foundation engagement portions that secure the lifting tool to the foundation. The foundation engagement portions are connected to two arms in a scissor configuration with a pivot point that can be nearer the operator than the engagement portions. The installer can grip handles that are positioned at the end of the arms opposite the engagement portions.

Figure 1:
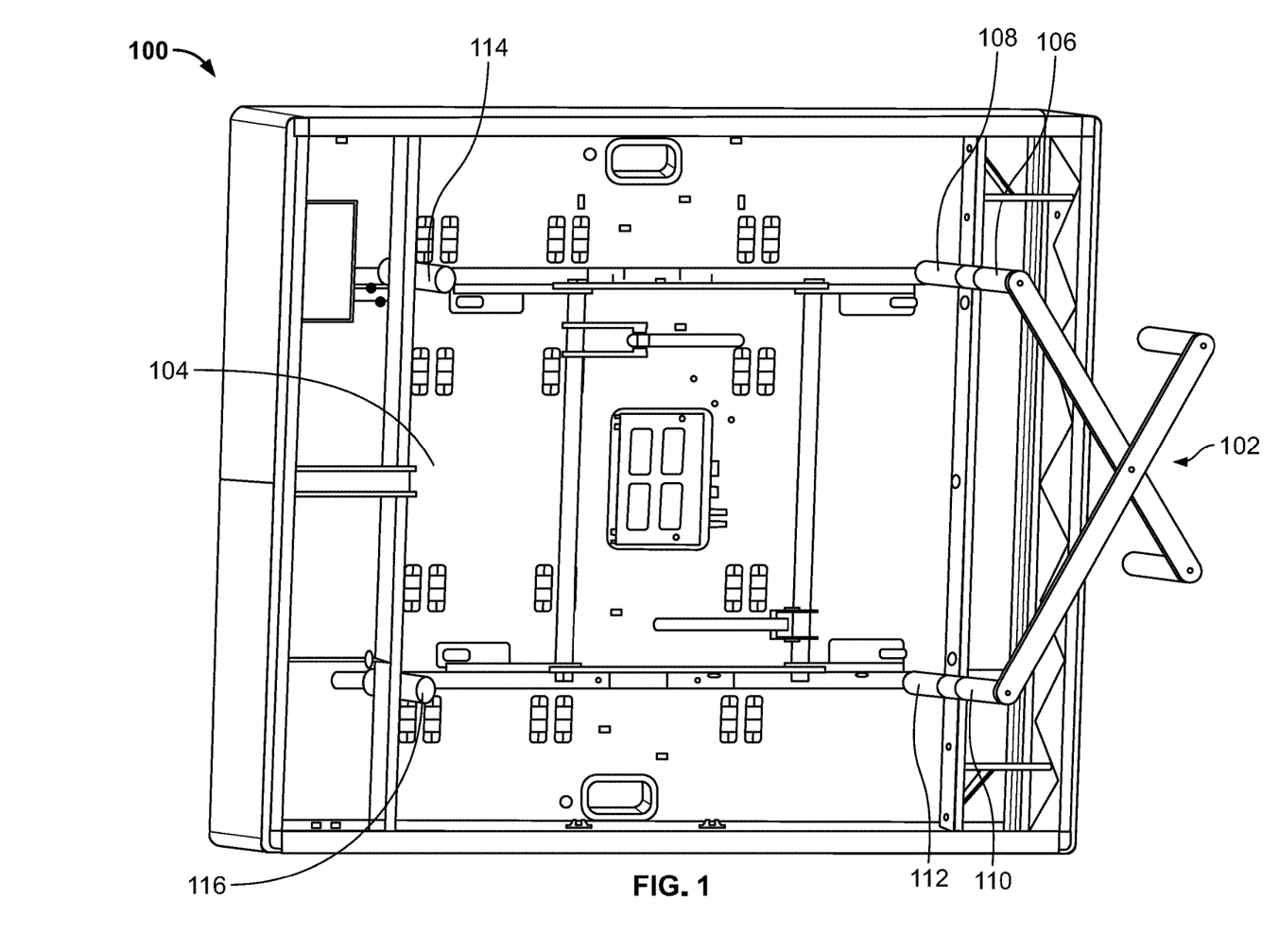
FIG. 1 is a perspective view of an example lifting tool connected to an example furniture foundation.

FIG. 1 is a perspective view of an example lifting tool 102 inserted into an example furniture foundation to make a lifting system 100. The lifting tool 102 engages the foundation, for example, a bed foundation 104, with a first foundation engagement portion 106 of the lifting tool 102 connected to the first portion 108 of the bed foundation 104 and the second foundation engagement portion 110 of the lifting tool 102 connected to the second portion 112 of the bed foundation 104. In some implementations, the first portion 108 and second portion 112 of the bed foundation 104 comprise portions of a first leg and a second leg. For example, the first portion 108 can be a first leg socket and the second portion 110 can be a second leg socket that are configured for receiving and holding legs, wherein the first foundation engagement portion 106 and second foundation engagement portion 110 are positioned at least partially within the first leg socket and the second leg socket, respectfully, to engage the first and second leg sockets. In some applications, leg sockets can be suitable and often ideal locations for insertion of the lifting tool 102 because leg sockets are already designed to support the bed foundation 104. As such, the leg sockets can have sufficient strength to transfer the weight of the bed foundation 104 to the lifting tool 102. In some implementations that utilize leg sockets, the first and second leg sockets of the foundation 104 can be configured to receive first and second leg portions (e.g. portions containing feet for the bed foundation 104) after the first and second foundation engagement portions 106 and 110 are removed from the first and second leg sockets.

In other implementations, lifting tool 102 can be engaged with portions of the bed foundation 104 other than leg sockets. For example, in some implementations, the lifting tool can engage other suitably strong portions of the bed foundation 104. In one implementation, the lifting tool 102 can engage one or more foundation leg portions (other than leg sockets). In some of such implementations, the lifting tool 102 can engage one or more leg portions in a manner other than inserting into sockets of leg sockets, such as grabbing an exterior portion of the one or more leg portions. In another implementation, the lifting tool 102 can engage one or more portions of a frame or sub-frame of the bed foundation 104 other than leg portions that are suitable for engagement with a lifting tool without undesirably damaging the bed foundation 104.

In some implementations, the lifting system 100 further includes a second tool (not shown) that can be similar to or identical to the first lifting tool 102. The second tool can be engaged with the bed foundation 104 with a first foundation engagement portion of the second tool connected to a third portion 114 of the bed foundation 104 and a second foundation engagement portion of the second tool connected to a fourth portion 116 of the bed foundation 104. Using two tools can allow two installers to apply lifting and stabilizing force to opposite ends of the bed foundation. Such an application of force can reduce stress on the installers and on the bed foundation 104, and can make moving the bed foundation 104 easier.

Figures 2A, 2B, 2C:
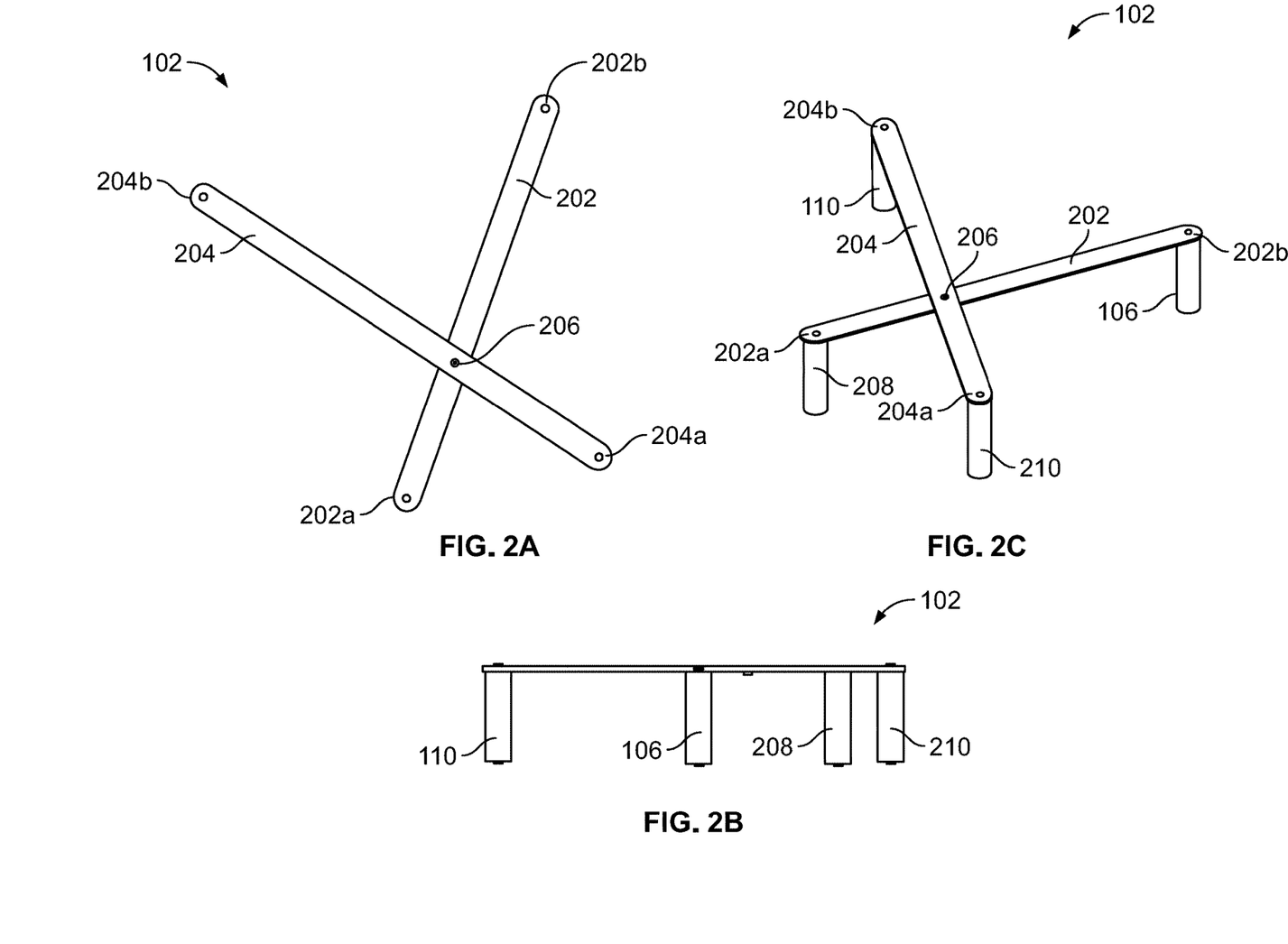
FIGS. 2A-2C are top, side, and perspective views of an example lifting tool.

FIGS. 2A-2C are top, side, and perspective views of the lifting tool 102. The lifting tool 102 includes a first member, or first arm 202, with a first proximal end 202a and a first distal end 202b. A second member, or second arm 204, has a second proximal end 204a and a second distal end 204b. In the context of this disclosure, the distal ends are ends configured to be nearer the furniture piece, such as the bed foundation 104 (FIG. 1), and the proximal ends are those configured to be nearer an operator or installer. Examples on what makes the proximal and distal ends distinct from one another are provided with various example implementations throughout this disclosure. The implementations described are examples, and should not be construed as limiting.

The first arm 202 is pivotably connected to the second arm 204 at a pivot point 206. The pivot point 206 is positioned along the first arm 202 and spaced from each of the first proximal end 202a and the first distal end 202b. The pivot point 206 is positioned along the second arm 204 and spaced from each of the second proximal end 204a and the second distal end 204b. In some implementations, the pivot point 206 is positioned the same distance from the first proximal end 202a and the second proximal end 204a. In some implementations, the pivot point 206 is closer to the first proximal end 202a and the second proximal end 204a than the first distal end 202b and the second distal end 204b.

The pivot point can be held together with a variety of elements, such as a press-fit bearing, a rivet, a bolt, a key hole/button slide retainer, a ring and groove quick disconnect, a cotter pin, a stamped retention feature, or any other equivalent fastener that allows radial movement between the first arm 202 and the second arm 204.

In the illustrated implementation, the first arm 202 and the second arm 204 each has a length that is greater than its width, and the width is greater than its thickness. The first arm 202 and the second arm 204 can have substantially identical (within typical manufacturing tolerances) cross-sections that are substantially rectangular (within typical manufacturing tolerances). Surfaces of the first arm 202 and the second arm 204 that are parallel to one another have a greater cross-sectional length (e.g. the width of the first and second arms 202 and 204) than the surfaces of the arms that are perpendicular to each other (e.g. the thickness of the first and second arms 202 and 204). Having the first and second arms 202 and 204 shaped with a larger width than thickness can facilitate vertical lifting of the bed foundation 104 by increasing a weight bearing capability of the lifting tool 102 while reducing an amount of material used. This can cause the lifting tool 102 to have a design that is both relatively strong and relatively light weight. The lifting tool 102 can be made of a variety of materials, including wood, metal, and/or plastic. When metal is used, aluminum, iron, and/or steel can be used.

The lifting tool 102 includes a first foundation engagement portion 106 and a second foundation engagement portion 110. The first foundation engagement portion 106 is positioned at the first distal end 202b of the first arm 202. The second foundation engagement portion 110 is positioned at the second distal end 204b of the second arm 204. As previously described, the first foundation engagement portion 106 is sized and configured to engage the first portion 108 of a bed foundation 104 (FIG. 1). The second foundation engagement portion 110 is sized and configured to engage a second portion 112 of the bed foundation 104 (FIG. 1). In the illustrated implementation, the first foundation engagement portion 106 and the second foundation engagement portion 110 are cylindrical in shape. In other implementations, another shape that is suitably configured to be inserted and secured to a portion of the bed foundation 104 can be used. In some implementations, an outer surface of the first foundation engagement portion 106 and an outer surface of the second foundation engagement portion 110 can have a similar shape to an internal surface of the first portion 108 and the second portion 112 of the bed foundation 104 while allowing for a small amount of clearance. For example, there may be a gap of 10-40 thousandths of an inch between the outer surface of an engagement portion and an inner surface of a foundation portion. Such tight tolerances can allow for the first and second foundation engagement portions 106 and 110 to be inserted into the first and second portions 108 and 112 when connecting the lifting tool 102 to the bed foundation 104 and also allow for a friction fit of the first foundation engagement portion 106 and the second foundation engagement portion 110 with the first portion 108 and second portion 112 of the bed foundation 104 when a user lifts the bed foundation 104 via the lifting tool 102.

For example, when the bed foundation 104 is held sideways with the lifting tool 102 engaged with the bed foundation 104 and with a user holding on to one of the first and second handles 208 and 210, the weight of the foundation and pivoting action of the lifting tool 102 can cause the first and second foundation engagement portions 106 and 110 to press against inner surfaces of the first and second portions 108 and 112 of the bed foundation 104. When a user lifts on one of the first and second handles 208 and 210 that is vertically higher, the first and second foundations engagement portions 106 and 110 can be forced in a direction away from one-another. When a user lifts on one of the first and second handles 208 and 210 that is vertically lower, the first and second foundations engagement portions 106 and 110 can be forced in a direction toward one-another. Accordingly, some implementations of the lifting tool 102 can have a suitable fiction engagement with the bed foundation 104 regardless of which of the first and second handles 208 and 210 is being held at a given time. Providing a user with two different handle options at different locations can improve the ability of the user to lift the bed foundation 104 in an ergonomically suitable way, such as when moving the bed foundation 104 up or down stairs.

In some implementations, a locking mechanism can be included with the first foundation engagement portion 106 and/or the second foundation engagement portion 110. Such locking mechanisms can include an expandable packer, a bayonet-style locking mechanism, a button style locking mechanism, an ancillary compressive gap filler attachment, a quick release pin, a two wire snap, a quick release ball bearing pin, a tapered frictional fit locator post, or any other locking mechanism capable of preventing the first foundation engagement portion 106 and/or the second foundation engagement portion 110 from prematurely being removed from the bed foundation 104. In various implementations, the first foundation engagement portion 106 and/or the second foundation engagement portion 110 can be secured to the bed foundation 104 sufficiently to allow the bed foundation 104 to be moved in a substantially vertical position plus or minus five to twenty-five degrees from vertical.

The first foundation engagement portion 106 and the second foundation engagement portion 110 can be attached to the first arm 202 and the second arm 204 in a variety of ways. For example, the first foundation engagement portion 106 and the second foundation engagement portion 110 can be welded to the first arm 202 and the second arm 204 respectively. In some implementations, the first foundation engagement portion 106 and the second foundation engagement portion 110 can be attached to the first arm 202 and the second arm 204 respectively with bolts, bayonet-style connectors, rivets, or another suitable fastener. In some implementations, particularly when a cylindrical cross-section is not used, the first foundation engagement portion 106 and the second foundation engagement portion 110 can be attached so that they are free to rotate. Such rotation can be useful for aligning the first foundation engagement portion 106 and/or the second foundation engagement portion 110 with respective first portions 108 and second portions 112 (FIG. 1) of different model bed foundations. In some implementations, the first foundation engagement portion 106 and/or the second foundation engagement portion 110 can be adjustable and/or can be removable and can be changed out with different shapes and sized to accommodate a variety of furniture pieces.

The lifting tool 102 includes a first handle 208 positioned at the first proximal end 202*a* of the first arm 202, while a second handle 210 is positioned at the second proximal end 204*a* of the second arm 204. As illustrated, the first handle 208 and the second handle 210 are substantially cylindrical and are substantially parallel to an axis of the pivot point 206 within typical manufacturing tolerances. The first handle 208 and the second handle 210 extend from the first arm 202 and the second arm 204, respectively, in the same direction. While illustrated with cylindrical handles, other shapes can be used. For example, a hexagonal shape, a square shape, a rectangular shape, an octagonal shape, a D-grip, or a T-grip can be used. Each of the handles can be long enough to provide enough surface area for a hand to easily grip onto in order to provide an installer a sufficient mechanical advantage. For example, the length can be sufficient to extend beyond a palm width of a typical installer.

The first handle 208 and the second handle 210 can be attached in a variety of ways. For example, the first handle 208 and the second handle 210 can be welded to the first arm and the second arm respectively. In some implementations, the first handle 208 and the second handle 210 can be attached to the first arm 202 and the second arm 204 respectively with bolts, bayonet-style connectors, rivets, or another suitable fastener. In some implementations, such as when a cylindrical cross-section is not used, the first handle 208 and the second handle 210 can be attached so that they are free to rotate. Such rotation can be useful for aligning the handles so that the installers can get a better grip on the handle.

As illustrated, the first foundation engagement portion 106 and the second foundation engagement portion 110 extend from the first arm 202 and the second arm 204, respectively, in the same direction as and parallel to the first handle 208 and the second handle 210. Such an arrangement reduces a moment (rotational) force experienced by the installers during lifting operations. In some implementations, other orientations can be used. For example, the first foundation engagement portion 106 and the second foundation engagement portion 110 can extend from the first arm 202 and the second arm 204, respectively, in an opposite direction as and parallel to the first handle 208 and the second handle 210. In some implementations, the first handle 208 and the second handle 210 can be substantially parallel to the first arm 202 and the second arm 204.

Figure 3:
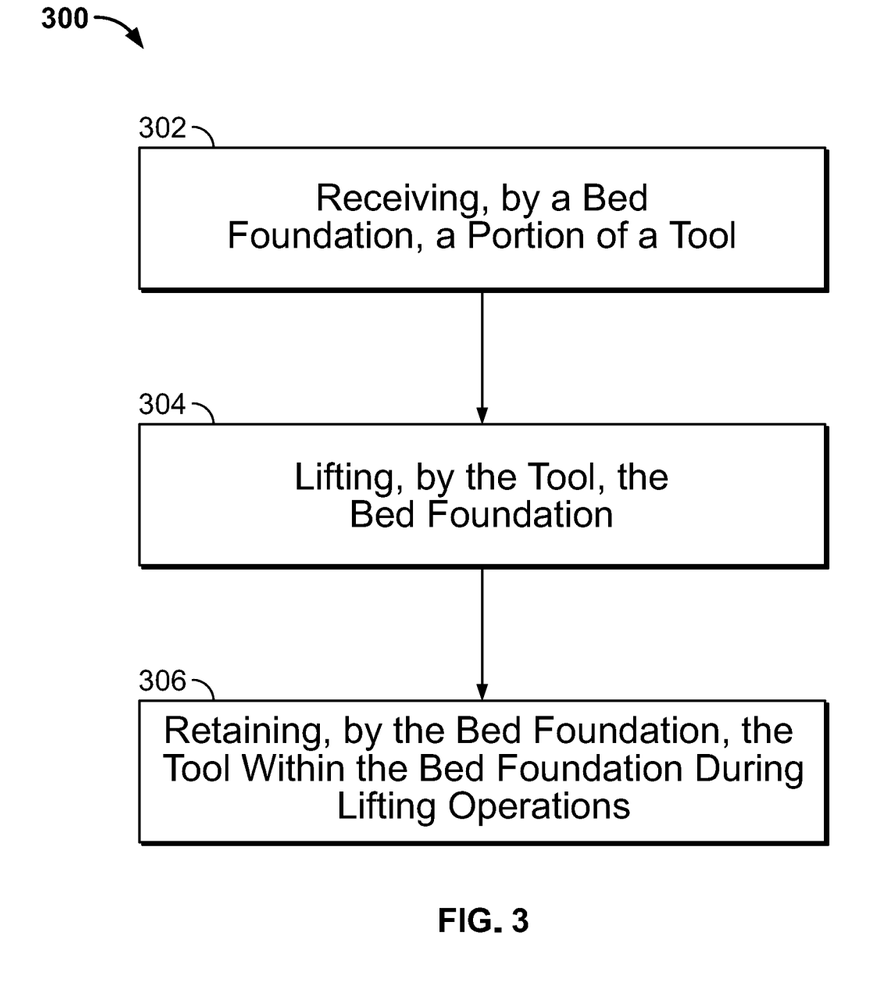
FIG. 3 is a flowchart of a method that can be used with aspects of this disclosure.

In some implementations, the first handle 208 and/or the second handle 210 can include a non-slip surface along their outer circumference. The non-slip surface can include an elastomer coating, such as rubber. In some implementations, the non-slip surface can include a machine-roughened surface. Other coatings can include leathers, latex or other natural materials, foam, nonskid sandpaper, or any combination FIG. 3 is a flowchart of a method 300 that can be used with aspects of this disclosure. At 302, a portion of the lifting tool 102 is received by the bed foundation 104. At 304, the bed foundation 104 is lifted by the lifting tool 102. At 306, the lifting tool 102 is retained within the bed foundation 104 during lifting operations by the bed foundation 104.

In some instances, the bed foundation 104 is moved from a first location to a second location during lifting operations, such as into and out of rooms of a house or building, which can include moving up or down stairs. In such an instance, the lifting tool 102 is retained by the bed foundation 104 within one or more portions of the bed foundation 104 during moving operations. After moving and lifting operations are ceased, the lifting tool 102 is released from the bed foundation.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. Moreover, the implementations shown and described in the figures can in some cases be modified as suitable for the application. For example, in some implementations the lifting tool 102 can include a pivot point 206 at a location different than illustrated, such as at a different location along a central portion of the first and second arms 202 and 204. Additionally, in some implementations one or more components of the lifting tool 102 can be sized and shaped differently than as illustrated. For example, the lifting tool 102 can have additional features and attachments, such as a motor cord retainer hook feature bed foundations that include a power chord.

What is claimed is:

1. An engaging and lifting tool for a furniture item, the tool comprising:
   a first member having a rectangular cross section and having a first proximal end and a first distal end;
   a second member having a second proximal end and a second distal end, wherein the first member is pivotably connected to the second member at a pivot point that is positioned along the first member and spaced from each of the first proximal end and the first distal end and that is positioned along the second member and spaced from each of the second proximal end and the second distal end, the pivot point being equally spaced from the first proximal end and the second proximal end;
   a first handle positioned at the first proximal end of the first member;
   a second handle positioned at the second proximal end of the second member;
   a first foundation engagement portion sized and configured to engage a first portion of a furniture foundation, wherein the first foundation engagement portion is positioned at the first distal end of the first member; and
   a second foundation engagement portion sized and configured to engage a second portion of the furniture foundation, wherein the second foundation engagement portion is positioned at the second distal end of the second member,
   wherein the first handle and the second handle extend from the first member and the second member, respectively, in the same direction,
   wherein the first foundation engagement portion and the second foundation engagement portion extend from the first member and the second member, respectively, in the same direction as the first handle and the second handle,
   wherein the first foundation engagement portion and the second foundation engagement portion comprise cylinders,
   wherein the first foundation engagement portion and the second foundation engagement portion are configured to be inserted into a first receiving portion of the furniture foundation and a second receiving portion of the furniture foundation, respectively.

2. The tool of claim 1, wherein the first, member and the second member have identical rectangular cross-sections, sides of the members that are parallel to one another having a greater cross-sectional length that the sides of the arms being perpendicular to one another.

3. The tool of claim 1, wherein the first handle and the second handle are cylindrical, the first handle and the second handle being parallel to a pivot axis.

4. The tool of claim 3, wherein the first handle and the second handle comprise a non-slip surface along their outer circumference.

5. The tool of claim 4, wherein the non-slip surface comprises an elastomer coating.

6. The tool of claim 1, wherein the first foundation engagement portion and the second foundation engagement portion are welded to the first member and the second member respectively.

7. The tool of claim 1, wherein the first handle and the second handle are welded to the first member and the second member respectively.

8. The tool of claim 1, wherein the pivot point is closer to the first proximal end and the second proximal end than the first distal end and the second distal end.

9. The tool of claim 1, wherein a cylindrical surface of the engagement portion is arranged to contact the receiving portion.

10. The tool of claim 1, wherein the first foundation engagement portion and the second foundation engagement portion consist of a single cylinder for each.

11. A system comprising:
    a tool for engaging and lifting a bed foundation, the tool comprising:
       a first arm having a first proximal end and a first distal end;
       a second arm having a second proximal end and a second distal end, wherein the first arm is pivotably connected to the second arm at a pivot point that is positioned along the first arm and spaced from each of the first proximal end and the first distal end and that is positioned along the second arm and spaced from each of the second proximal end and the second distal end;
       a first handle positioned at the first proximal end of the first arm;
       a second handle positioned at the second proximal end of the second arm;
       a first foundation engagement portion sized and configured to engage a first portion of a bed foundation, wherein the first foundation engagement portion is positioned at the first distal end of the first arm; and
       a second foundation engagement portion sized and configured to engage a second portion of the bed foundation, wherein the second foundation engagement portion is positioned at the second distal end of the second arm; and
    a bed foundation, wherein the tool is engaged with the bed foundation with the first foundation engagement portion of the tool connected to the first portion of the bed foundation and the second foundation engagement portion of the tool connected to the second portion of the bed foundation.

12. The system of claim 11, wherein the tool is a first tool, the system further comprising a second tool that is substantially identical to the first tool, wherein the second tool is engaged with the bed foundation with a first foundation engagement portion of the second tool connected to a third portion of the bed foundation and a second foundation engagement portion of the second tool connected to a fourth portion of the bed foundation.

13. The system of claim 11, wherein the first and second portions of the bed foundation comprise first and second leg portions.

14. The system of claim 11, wherein the first and second portions of the bed foundation comprise first and second leg sockets configured for receiving and holding legs, wherein the first and second foundation engagement portions are positioned at least partially in the first and second leg sockets to engage the first and second leg sockets.

15. A method comprising:
inserting a first and second foundation engagement portions of a tool into a first and second leg sockets of a bed foundation prior to lifting;
receiving, by the bed foundation, a portion of the tool;
lifting, by the tool, the bed foundation in a substantially vertical alignment with a top of the bed foundation facing one side and a bottom of the bed foundation facing an opposite side, wherein the tool comprises first and second foundation engagement portions that are sized and configured to be inserted in first and second leg sockets of the bed foundation;
retaining, by the bed foundation, the portion of the tool within the bed foundation during lifting operations;
removing the first and second foundation engagement portions from the first and second leg sockets; and
inserting first and second leg portions in the first and second leg sockets after removing the first and second foundation engagement portions from the first and second leg sockets.

16. The method of claim 15, further comprising:
moving the bed foundation from a first location to a second location that includes moving the bed foundation either up or down a staircase; and
retaining, by the bed foundation, the tool within the bed foundation during moving operations including during moving either up or down the staircase.

17. The method of claim 15, wherein inserting the first and second foundation engagement portions into the first and second leg sockets of a bed foundation comprises contacting an outer surface of the first and second foundation engagement portions with an inner surface of the first and second leg sockets.

* * * * *

UNITED STATES PATENT AND TRADEMARK OFFICE
CERTIFICATE OF CORRECTION

PATENT NO. : 11,001,447 B2  
APPLICATION NO. : 16/122480  
DATED : May 11, 2021  
INVENTOR(S) : Nathan Shutes, Allan Kiekhoefer and Darryl Schmitz Page 1 of 1

It is certified that error appears in the above-identified patent and that said Letters Patent is hereby corrected as shown below:

In the Claims

Column 10, Line 1, In Claim 2, delete "first," and insert -- first --, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*